(12) United States Patent
Kamiyama et al.

(10) Patent No.: US 8,418,735 B2
(45) Date of Patent: *Apr. 16, 2013

(54) VEHICLE WHEEL

(75) Inventors: Youichi Kamiyama, Saitama (JP); Katsushi Ishii, Saitama (JP); Hisamitsu Takagi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/453,107

(22) Filed: Apr. 23, 2012

(65) Prior Publication Data

US 2012/0200143 A1 Aug. 9, 2012

Related U.S. Application Data

(63) Continuation of application No. 12/582,228, filed on Oct. 20, 2009, now Pat. No. 8,181,685.

(30) Foreign Application Priority Data

Oct. 21, 2008 (JP) ................................. 2008-270733

(51) Int. Cl.
*B60B 21/02* (2006.01)
*B60C 19/00* (2006.01)

(52) U.S. Cl.
USPC ...................... 152/381.6; 301/6.91

(58) Field of Classification Search ............... 152/381.5, 152/381.6, 400, 516, 518, 519, 520; 301/6.91
See application file for complete search history.

(56) References Cited

U.S. PATENT DOCUMENTS

| | | | |
|---|---|---|---|
| 6,516,849 B2 | 2/2003 | Flament et al. | |
| 7,690,410 B2 | 4/2010 | Kamiyama et al. | |
| 7,896,043 B2 | 3/2011 | Kashiwai et al. | |

FOREIGN PATENT DOCUMENTS

| | | |
|---|---|---|
| JP | 2004-090669 A | 3/2004 |
| JP | 2004-306760 A | 11/2004 |
| JP | 2006-273182 A | 10/2006 |
| JP | 2006-298231 A | 11/2006 |

*Primary Examiner* — Kip T Kotter
(74) *Attorney, Agent, or Firm* — Carrier Blackman & Associates, P.C.; Joseph P. Carrier; William D. Blackman

(57) ABSTRACT

A vehicle wheel includes a disk and a rim having a well portion and fixed to the disk for supporting a tire, and an additional air chamber member secured to an outer circumferential surface of the well portion in a tire air chamber defined between the rim and the tire. The additional air chamber member includes an additional air chamber and a communication pipe with a communication through hole therein for communication between the additional air chamber and the tire air chamber, and the communication pipe protrudes from the peak in a direction substantially parallel to an axial direction of the wheel. The additional air chamber has a peak in a radial direction of the vehicle wheel. A radius of rotation of the wheel at the tip of the communication through hole is ≧ a radius of rotation of the wheel at the peak of the additional air chamber.

4 Claims, 5 Drawing Sheets

VEHICLE WHEEL

CROSS REFERENCE TO RELATED APPLICATIONS

This application is a continuation of application Ser. No. 12/582,228, filed 20 Oct. 2009 (now U.S. Pat. No. 8,181,685), which claims the foreign priority benefit under Title 35, United States Code, §119(a)-(d) of Japanese Patent Application No. 2008-270733, filed on Oct. 21, 2008 in the Japan Patent Office. The disclosures of the prior applications are herein incorporated by reference in their entireties.

BACKGROUND OF THE INVENTION

1. Field of the Invention

The present invention relates to a vehicle wheel with reduction in noise due to air column resonation (cavity resonation) in a tire air chamber.

2. Description of the Related Art

Generally, the air column resonance generated in an air chamber of a tire (hereinafter referred to as tire air chamber) may generate road noise of a vehicle. The air column resonance is a phenomenon that random vibrations of a tire caused by roughness of a road surface cause vibrations of the air in the tire air chamber, and a resonance occurs around an air chamber resonance frequency of a tire air chamber, which generates resonance noise.

JP 3992566 (JP 2004-90669 A) discloses a vehicle wheel capable of reducing resonance noise caused by the air column resonation. The vehicle wheel has a plurality of additional air chambers in a circumferential direction of the rim. More specifically, a lid covers an annular space formed between an annular vertical wall vertically extending from a well portion and extending in the circumferential direction of the rim and a side wall of the well portion extending to a bead seat. A plurality of additional air chambers are formed by sectioning the annular space, defined by the lid, the well portion, and vertical wall, with partition walls equi-distantly disposed in the circumferences of the rim. The tire air chamber is communicated with each additional air chamber through communication holes formed in the lid. This vehicle wheel is capable of reducing the air column resonance in the tire air chamber by forming a Helmholtz resonator with the communication through holes and the additional air chambers.

It is known that water may enter a tire air chamber of a tire due to air charge and deterioration with age. While a vehicle travels, water in the tire air chamber is vaporized. After stop of the vehicle, water is condensed as dew in additional air chambers. Repeat of the cycle causes accumulation of water in the additional air chamber members, which results in variation in a volume of the additional air chamber. This shifts a resonance frequency of a Helmholtz resonator, so that reduction in the air column resonation may decrease. In this case, it is necessary to remove the water in the additional air chambers.

The present invention provides a vehicle wheel capable of keeping reduction effect on noise sound generation for a long time period without maintenance.

SUMMARY OF THE INVENTION

A first aspect of the present invention provides a vehicle wheel comprising: a disk and a rim having a well portion and fixed to the disk for supporting a tire for the vehicle; and an additional air chamber member secured to an outer circumferential surface of the well portion in a tire air chamber defined between the rim and the tire, the additional air chamber member comprising an additional air chamber and a communication pipe with a communication through hole therein for communication between the additional air chamber and the tire air chamber. The additional air chamber has a peak in a radial direction of the vehicle wheel. A radius D2 of rotation of the vehicle wheel at the tip of the communication through hole is equal to or greater than a radius D1 of rotation of the vehicle wheel at the peak of the additional air chamber.

According to this structure, as the wheel rotates, a centrifugal force is applied to water accumulated in the additional air chamber, and the centrifugal force applied to the water may become greatest at the tip of the communication tube, because the centrifugal force may be proportional to a radius of rotation of the vehicle wheel in magnitude. Further, every time the vehicle is started and stopped, inertial forces in both direction in the circumferential direction of the wheel are alternately applied to the water in the additional air chamber. According to this structure, during traveling of the vehicle, reciprocating movement of the water is repeated. As a result, the water may be discharged from the communication through hole.

A second aspect of the present invention provides the vehicle wheel based on the first aspect, wherein the additional air chamber member curves along a circumferential direction of the vehicle wheel and further comprises an inner plate and an outer plate as parts defining the additional air chamber. The inner plate has a radius R2 of curvature. The outer plate has a radius R1 of curvature. The radius R1 is smaller than the radius R2.

According to this structure, while the vehicle wheel rotates at a constant rotation speed, forces may be applied to the water in the additional air chamber in directions from both ends of the additional air chamber to a center (peak) of the additional air chamber. This may prevent the water from staying at both ends of the additional air chamber.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings

DETAILED DESCRIPTION OF THE INVENTION

Embodiment

With reference to drawings will be described a vehicle wheel of an embodiment according to the present invention.

In the vehicle wheel of the embodiment, additional air chamber members (Helmholtz resonator) are secured to the wheel 10 by fitting the additional air chamber members into a channel 17 on a well portion.

After describing a whole structure of the vehicle wheel, will be described a structure of the additional air chamber members.

Whole Structure of Vehicle Wheel

Figure 1:
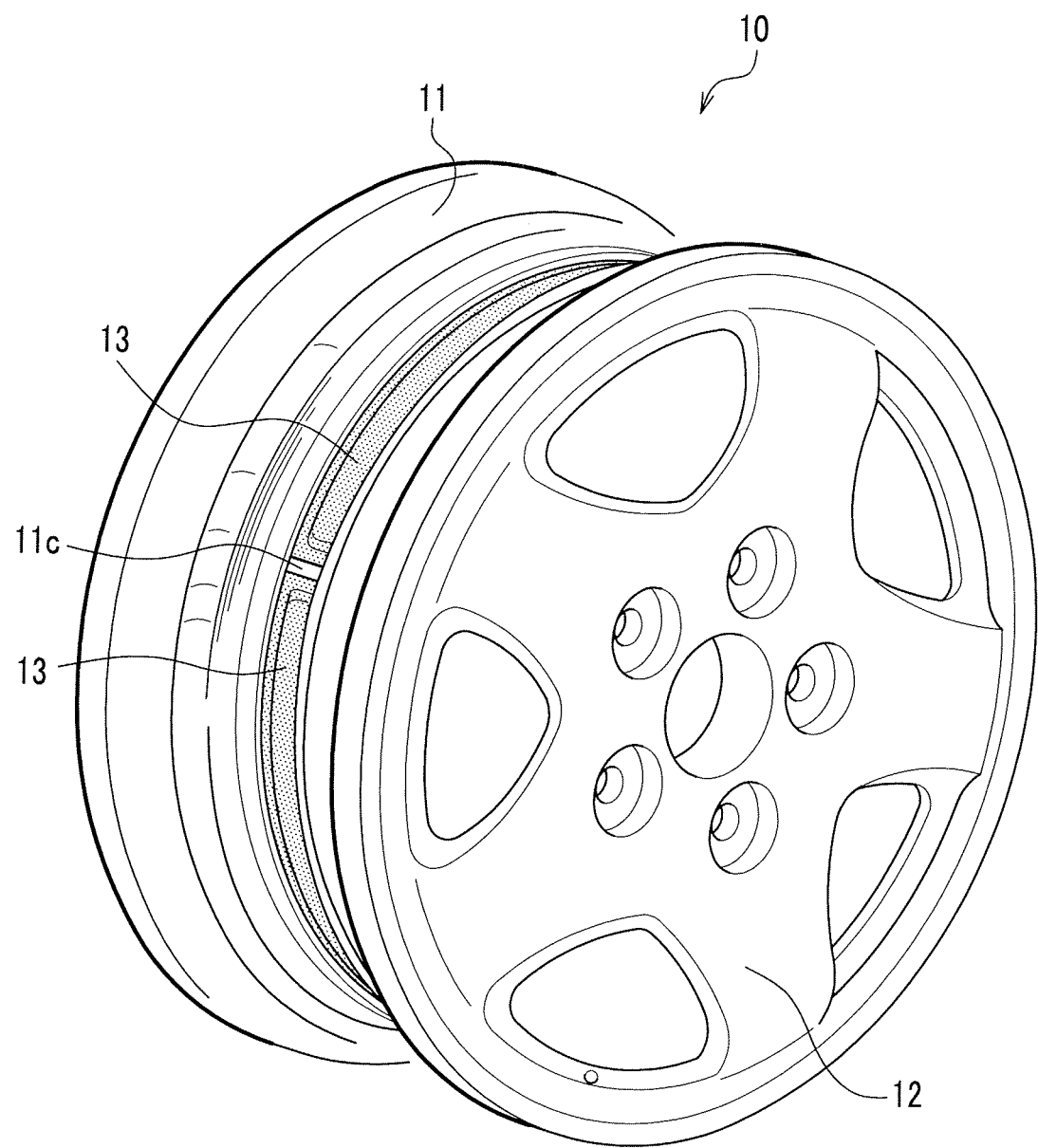
FIG. 1 is a perspective view of the vehicle wheel according to an embodiment of the present invention.
Figure 2:
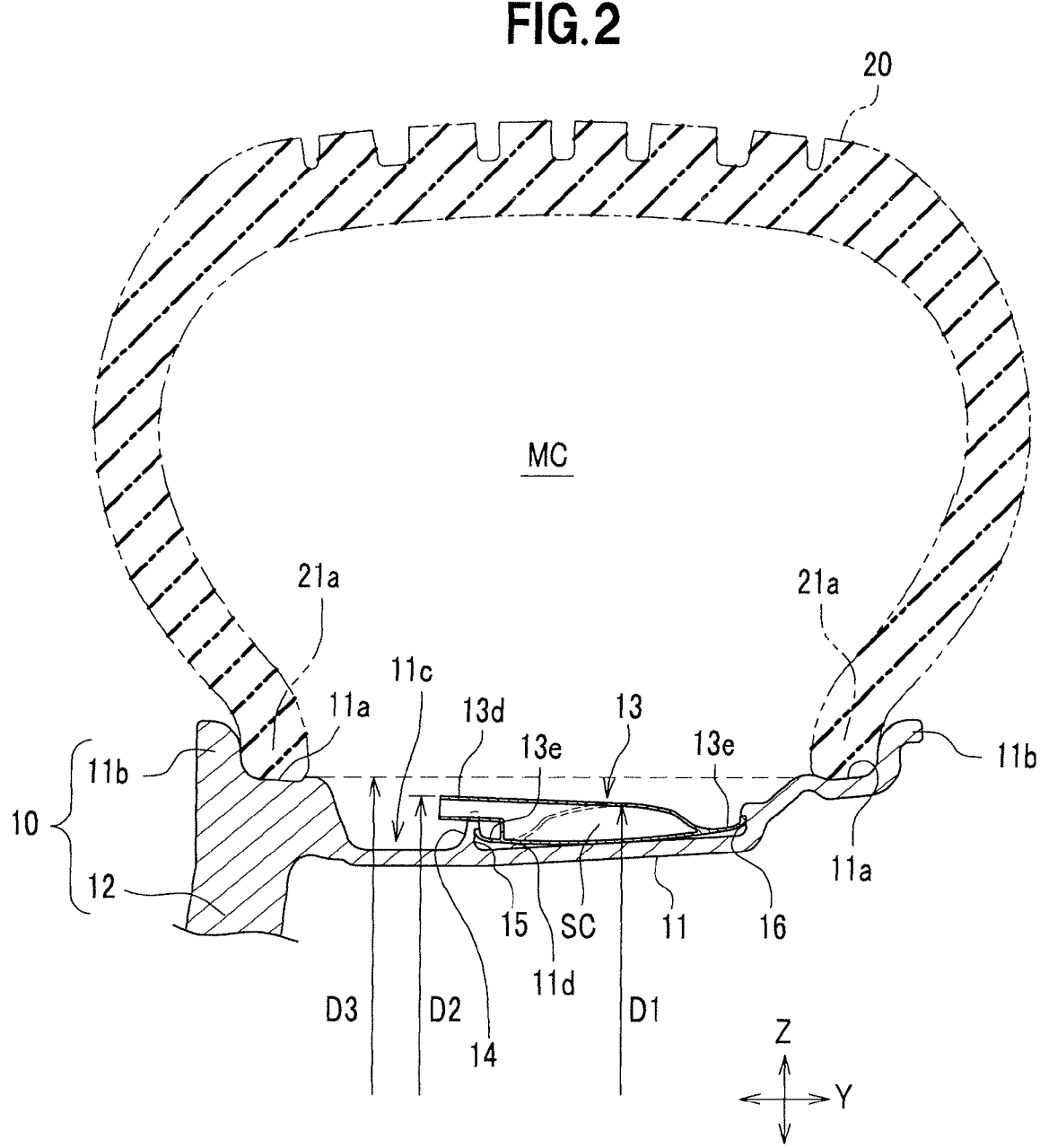
FIG. 2 is a sectional front view of a main part of the vehicle wheel on which a tire is put.
Figure 3:
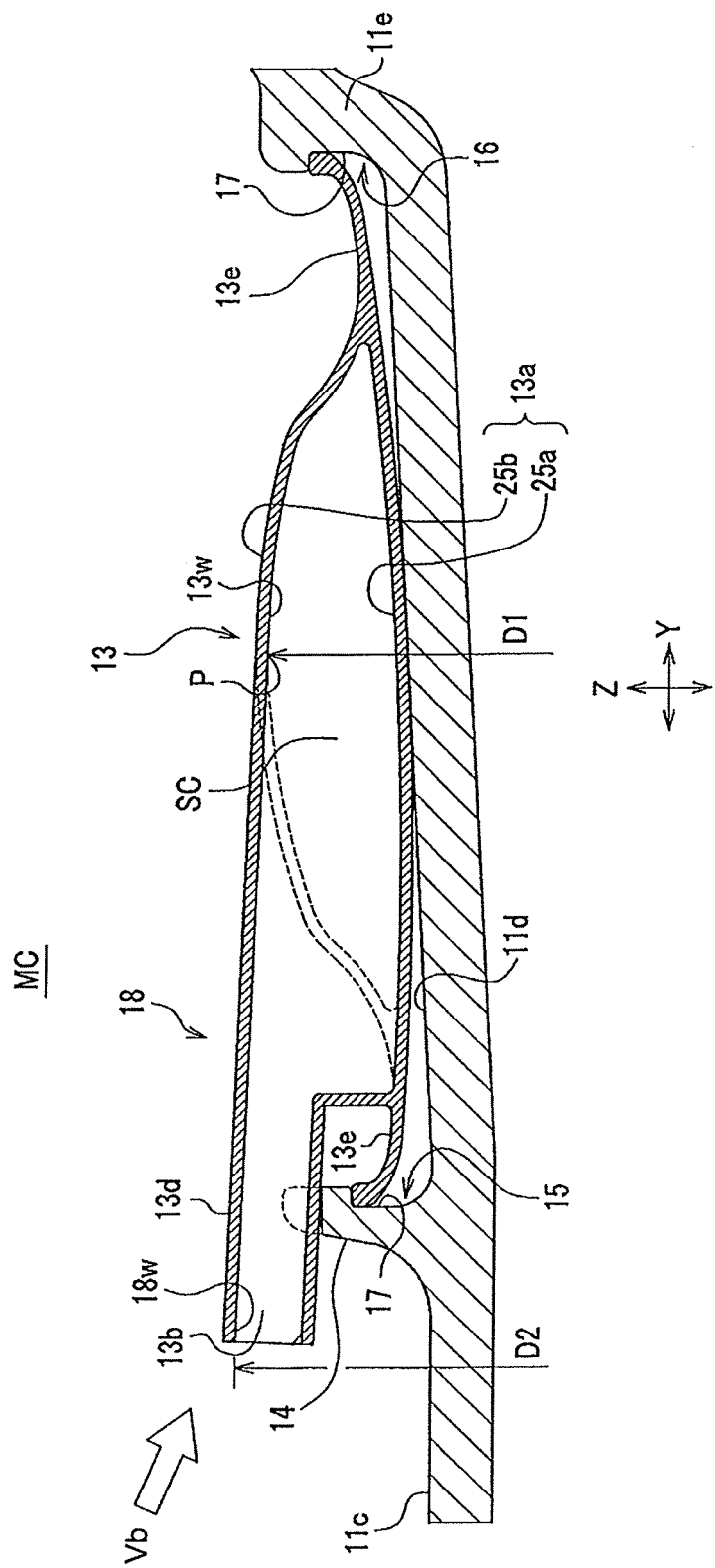
FIG. 3 is an enlarged sectional front view of a well portion to which the additional air chamber member is secured.

FIG. 1 is a perspective view of the vehicle wheel according to the embodiment. FIG. 2 is a sectional front view, taken on a plane containing the axis of rotation of a main part of the vehicle wheel on which a tire is put. FIG. 3 is a partially enlarged sectional view of the well portion shown in FIG. 2.

As shown in FIG. 1, the vehicle wheel 10 mainly includes a rim 11 for holding a tire 20 attached thereon, a disk 12 for connecting the rim 11 to a hub of the vehicle (not shown), and additional air chamber members 13 each having an additional air chamber SC therein (see FIG. 2), fixed to an outer circumferential surface 11d of a well portion 11c.

As shown in FIG. 2, the rim 11 has bead seats 11a formed at edges, in the width direction, of the vehicle wheel 10, rim flanges 11b extending from the bead seats 11a and being bent outside a radial direction of the vehicle wheel 10 (on an upper side of FIG. 2) in a form of letter "L", and the well portion 11c recessed in an inward radial direction Z of the vehicle wheel 10 between the bead seats 11a (on a low side of FIG. 2).

The tire 20 is attached to the rim 11 with the beads 21a being seated on the bead seats 11a. As a result, a tire air chamber MC is formed which is an air-tight space having an annular shape between an outer circumferential surface 11d and an inner circumferential surface of the tire 20.

The well portion 11c is provided to allow the beads 21a and 21a of the tire 20 to fall therein temporarily when the tire 20 is put on the rim 11.

As shown in FIG. 2, from the outside of the rim in the width direction Y of the vehicle wheel 10 (left side of FIG. 2), the disk 12 extends inwardly in the radial direction Z of the vehicle wheel 10 of which outer circumference is connected to the rim 11. The rim 11 and the disk 12 are manufactured, for example, with a high strength light weight metal such as an aluminum alloy and a magnesium alloy.

However, the material for the disk 12 is not limited to the aluminum alloy and the magnesium alloy, but may be formed with steel or the like. Further, the vehicle wheel 10 may be a spoke wheel.

FIG. 2 shows a one-piece type of wheel in which the disk 12 is integral with the rim 11. However, a two-piece type of vehicle wheel in which the disk is welded on the rim 11 can be used.

As shown in FIGS. 3 and 5, a vertical wall 14 is formed on the outer circumferential surface 11d, protrudes from the outer circumferential surface 11d of the well portion 11c outwardly in a radial direction, and extends in the circumferential direction of the vehicle wheel 10 to have an annular shape.

The vertical wall 14 has a first vertical wall surface 15 which extends upright in a radial direction Z of the vehicle wheel 10 from the outer circumferential surface 11d of the well portion 11c.

A side surface part 11e is formed on the outer circumferential surface 11d at a location on the well portion 11c inward in width direction Y of the vehicle wheel 10 (on the side of the vehicle) with a second vertical wall 16 facing the first vertical wall surface 15.

The vertical wall 14 can be formed integrally with the well portion 11c when the rim 11 is produced by casting.

These first vertical wall surface 15 and the second vertical wall surface 16 have channels 17, respectively.

These channels 17 provide annular recesses and openings extending in the circumferential direction X of the vehicle wheel 10 on the outer circumferential surface 11d of the well portion 11c. The openings face each other.

Fitted into these channels 17 and 17 are edge parts 13e of the additional air chamber member 13. The channels 17 and 17 are formed by machining the vertical wall 14 and the side surface part 11.

Structure of Additional Air Chamber

Figure 4:
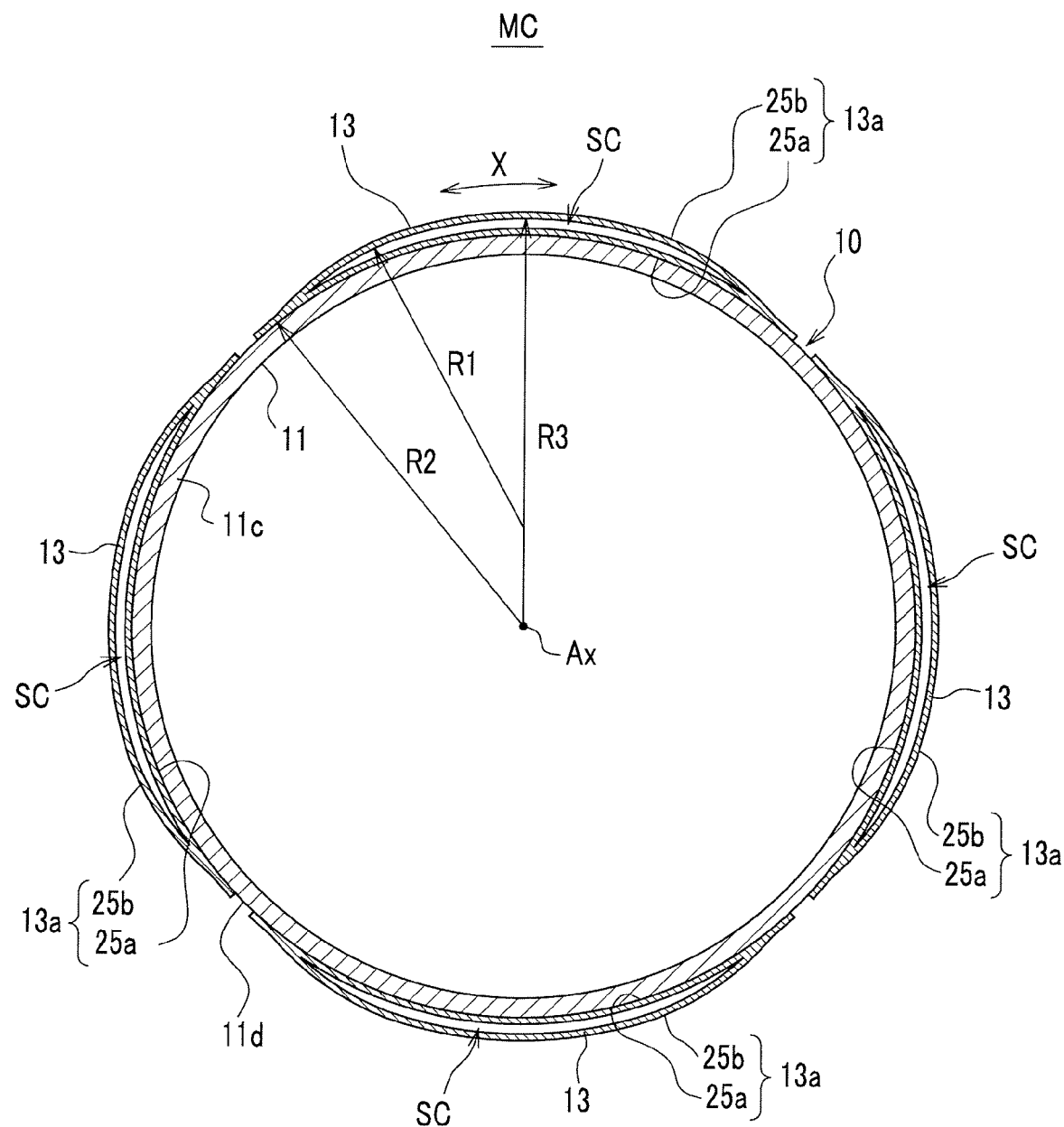
FIG. 4 is a side sectional view of the vehicle wheel, taken along the circumferential direction of the wheel.

Will be described the additional air chamber member 13. FIG. 4 is a side sectional view of the vehicle wheel, taken along the circumferential direction X of the wheel.

Figure 5A:
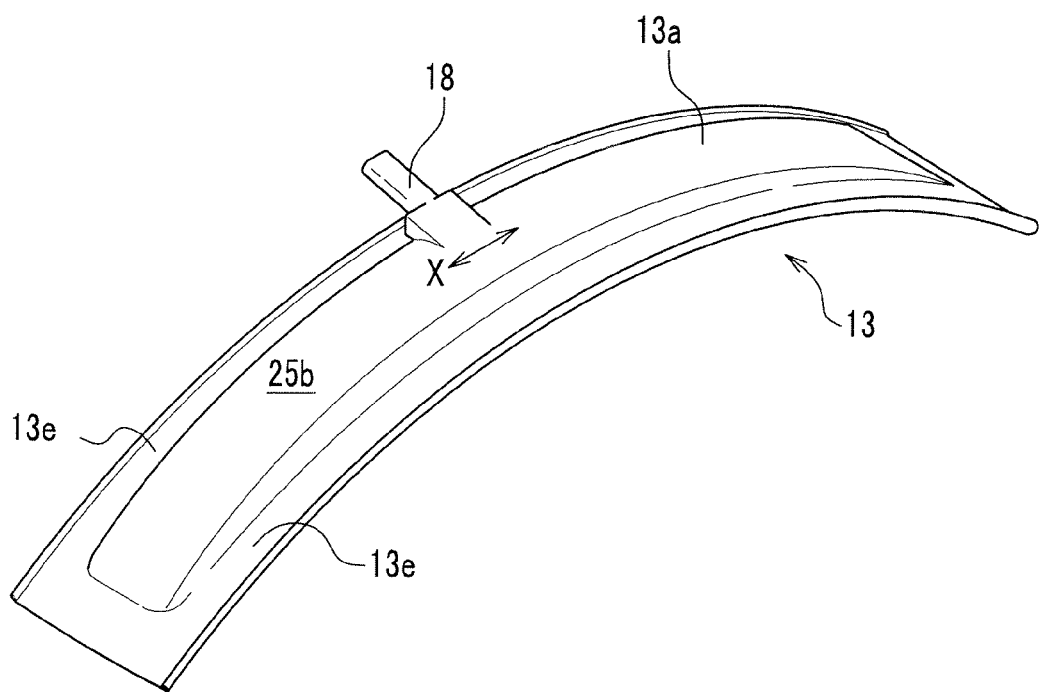
FIG. 5A is a perspective view of the additional air chamber member according to the first embodiment when viewed from a side of the upper plate thereof.
Figure 5B:
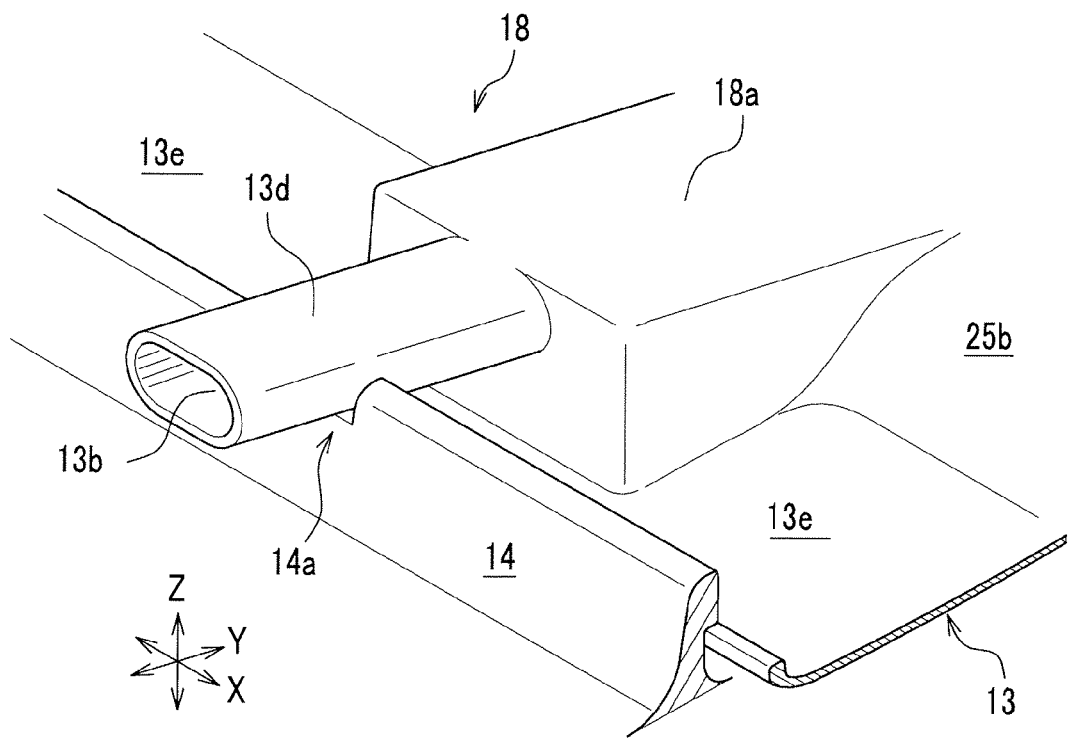
FIG. 5B is a detail perspective view of a portion of the additional air chamber member viewed from a direction of Vb in FIG. 3 showing a notch formed in the vertical wall of the well portion.

FIG. 5A is a perspective view of the additional air chamber member viewed from a side of an upper plate. FIG. 5B shows a protruding part viewed from a direction Vb in FIG. 3.

As shown in FIG. 4, four additional air chamber members 13 are disposed on the well portion 11c equi-distantly along the circumferential direction X of the wheel 10. In other words, the vehicle wheel 10 has two pairs of additional air chamber members 13, each pair having a couple of additional air chamber members 13 facing each other across a rotation center axis (a rotation center) Ax of the vehicle wheel 10. As shown in FIGS. 1, 4, 5A, each of the additional air chamber members 13 may be formed physically separate from the other additional air chamber members 13, with a portion of the rim well portion 11c exposed between opposed ends of adjacent ones of the members 13.

Note that there is no limitation in the number of the disposed additional air chamber members 13 and an arrangement interval. In other words, a single additional air chamber member or a plurality of additional air chambers can be disposed on the wheel, and are preferably disposed in such a way that a mass of the wheel, including a mass of the tire valve (not shown), is distributed in the circumferential direction X so as to maintain the proper wheel balance.

The additional air chamber member 13 is a long member extending in the circumferential direction X of the wheel 10 and comprises a body 13a, a protruding part 18 comprising a communication pipe 13d and edge parts 13e. The additional air chamber member 13 is curved along a longitudinal direction thereof and disposed along the outer circumferential surface 11d of the well portion 11c.

The additional air chamber member 13 is designed so as to satisfy Eq. (1) which determines a resonance frequency of a Helmholtz resonator. Accordingly, when dew, a puncture repair liquid, or the like is accumulated in the additional air chamber SC, a volume V of the additional air chamber SC varies, which reduces a noise suppression effect. Therefore, it is desirable that water generated in the additional air chamber is exhausted through the protruding part 18 and that no water stays in the additional air chamber SC.

$$f0 = C/2\pi \times \sqrt{(S/V(L+\alpha\sqrt{S}))} \tag{1}$$

where f0 (Hz): resonance frequency; C(m/s): a sound velocity in the additional air chamber (=sound velocity in the tire air chamber MC); V(m³): a volume of the additional air chamber SC; L(m): a length of the communication through hole 13b; S(m²): a cross sectional area of an opening of the communication through hole 13b; and α: a correction coefficient. In this process, all resonance frequencies f0 of four additional air chamber members 13A shown in FIG. 4 can be set to the same value or different values. More specifically, if the tire air chamber MC has two resonance frequencies f1 and f2, the resonance frequency f0 of four additional air chamber members 13A can be set to be (f1+f2)/2. Further, the resonance frequencies f0 of one pair of additional air chambers facing each other via the rotation center axis Ax (center of the rim 11) may be set to f1, and the resonance frequencies f0 of the other pair of additional air chambers facing each other via the rotation center axis Ax may be set to f2. Further, the resonance frequencies f0 of four additional air chambers may be set to either of f1 or f2.

Edge Part

The edge part 13e comprises a plate member extending from the body 13a toward circumference of the body 13a as shown in FIG. 5A.

The edge parts 13e are formed as shown by the sectional view of FIG. 3 where the bottom plate (inner plate) 25a and the upper plate (outer plate) 25b are adhered to each other. The edge part 13e extends from the body 13a in the circumferential direction X as well as in the width direction Y of the wheel 10, and the tips thereof extending in the width direction Y are fitted into the channels 17 of the vertical wall surface 15 and the second vertical wall surface 16.

The edge part 13e extending toward the first vertical wall surface 15 and the second vertical wall surface 16 forms together with the bottom plate 25a the curve surface (see FIG. 3) swelling toward the outer circumferential surface 11d of the well portion 11c.

The thickness of the edge part 13e according to the embodiment is set to be the same as the bottom plate 25a and the upper plate 25b. The edge part 13e has a sufficient spring elasticity (spring constant) by appropriately determining a thickness thereof and a plastic material.

As mentioned above, because the edge parts 13e have a sufficient spring elasticity (spring constant), the additional air chamber member 13A is easily, firmly secured to the rim 11 between the first vertical wall surface 15 and the second vertical wall surface 16.

The additional air chamber member 13 is preferably formed of plastic, having a light weight and high stiffness and allowing a blow molding, in consideration of reduction in weight, increase in mass productivity, reduction in manufacturing cost in the additional air chamber member 13, and keeping air-tightening the additional air chamber SC. Particularly, polypropylene is preferable because of high resistance to repeated bending fatigue.

Body

The body 13a comprises the bottom plate 25a and the upper plate 25b over the bottom plate 25a to form the additional air chamber SC therebetween.

Preferably, a volume of the additional air chamber SC is approximately from 50 to 250 cc. Setting the volume of the additional air chamber SC within this range (approximately from 50 to 250 cc) allows the additional air chamber member 13 to provide a sufficient noise reduction effect with suppression of increase in weight, which provides reduction in weight of the vehicle wheel 10.

A circumferential length of the additional air chamber members 13 in the circumferential direction X of the vehicle wheel 10 can be appropriately determined in consideration of a weight adjustment of the vehicle wheel 10 and easiness in assembling the additional air chamber members 13 into the well portion 11c, wherein a circumferential length of the rim 11 is the maximum circumferential length of the additional air chamber members 13.

The bottom plate 25a has a curvature on the sectional view of FIG. 4 taken along the circumferential direction X of the wheel 10 which is substantially identical with a radius of curvature R2 of the circumferential surface 11d of the well portion 11c to have a form disposed along the outer circumferential surface 11d.

On the other hand, the upper plate 25b is preferably formed so as to have a radius R1 of curvature smaller than the radius R2 of curvature of the bottom plate 25a (R1<R2) on the sectional view of FIG. 4 taken along the circumferential direction X of the wheel 10. According to this structure, when a centrifugal force is applied to water accumulated in the additional air chamber 13, the water is pushed toward the upper plate 25b as well as is subject to a component force directed to a peak position of the upper plate 25b (at a location of the upper plate 25b where a distance R3 from the rotation center axis Ax is maximum). The peak position is a peak of the additional air chamber SC in the radial direction Z. More particularly, as shown in FIG. 3, the outer plate 52b is curved such that there are different distances between portions of the outer plate 25b and the rotation center axis Ax of the wheel when viewed in a cross-sectional view taken in a direction parallel to the rotation center axis and wherein the largest distance from the rotation center axis Ax occurs at the peak P.

According to this structure, when the vehicle wheel 10 rotates at a constant rotation speed, water staying at both ends of the additional air chamber 13 in the circumferential direction X of the wheel 10 comes to and gathers at the peak position.

As shown in FIGS. 5A and 5B, the protruding part 18 extends from the peak position of the upper plate 25b in a direction orthogonal to the circumferential direction X (width direction Y) of the wheel 10. The protruding part 18 comprises a root part 18a connected to the additional air chamber member and provided by forming a portion of the upper plate into a box shape. The protruding part 18 extends from the root part 18a in the width direction Y and further comprises a communication pipe 13d having an inner surface 18w defining a through hole 13b for communication between the additional air chamber SC and the tire air chamber MC (also see FIG. 3) via the root part 18a.

The protruding part 18 fits into a notch 14a in the vertical wall 14 at the communication pipe 13d thereof to prevent the additional air chamber member 13 from shifting in the circumferential direction X of the wheel 10.

An inner surface 18w of a tip of the communication through hole 13b is configured so as to make a radius D2 from the rotation center axis Ax greater than a radius D1 at the peak P of an inner surface 13w of the additional air chamber SC when the additional air chambers 13 are attached to the vehicle wheel 10.

According to this structure, while the vehicle wheel 10 rotates, water accumulated in the additional air chamber SC is subject to centrifugal force acting outwardly in the radial direction of the vehicle wheel 10. The centrifugal force, which is proportional to a rotation radius of the vehicle wheel 10, is applied to the water accumulated in the additional air chamber SC, and is greatest at the tip of the communication through hole 13b.

In other words, creation of stream of water from the tip of the communication through hole 13b toward the tire air chamber MC allows the water to be continuously, gradually discharged along the inner wall 13w of the additional air chamber SC.

Accordingly, even if the radius D2 is made identical with the radius D1 at the peak location of the additional air chamber, it is found that the same water discharge operation is provided (D1≦D2).

According to this structure, the water accumulated in the additional air chamber SC is discharged through the communication through hole 13b to the inside the tire air chamber MC during traveling. Further, as long as the relation of D1 D2 (see FIG. 2) is kept, even if the radius R1 of curvature partially has a relation of R1=R2 or R1>R2, the additional air chamber SC is provided with the water discharge operation. In other words, every time the vehicle repeats start and stop, inertial forces in both directions in the circumferential direction X of the wheel 10 are alternately applied to the water accumulated in the additional air chamber SC. This moves the water accumulated in the additional air chamber to the root part 18a of the communication through hole 13b, so that the water is discharged from the tip of the communication through hole 13b. Further, the water may be moved along an inner surface 13w of the additional air chamber SC in accordance with the location of the water.

Further, in the vehicle wheel 10, as shown in FIG. 2, the radius D2 from the rotation center axis Ax of the vehicle wheel 10 to an outer surface that is outside in the radial direction of the vehicle wheel of the tip of the communication pipe 13d is determined to be smaller than the radius D3 from the rotation center axis Ax of the vehicle wheel 10 to the bead seats 11a (D2<D3). This decreases a possibility in that a tool such as a lever or a tire 20 (beads 21a or the like) contacts the additional air chamber member 13A. As a result, the attachment of the wheel to the tire 20 is more efficiently done.

Looking at FIG. 2, it may be found that the communication through hole 13b may interfere with the tire 20 during assembling the tire 20. However, the communication through hole 13 is formed within a partial zone, and it does not affect the assembling in effect.

A cross sectional shape of the communication through hole 13b is not limited. In the embodiment, the cross sectional shape is an oval (see FIG. 5B), but may be any one of a circle, a polygon, or a half circle. If the cross sectional shape is a circle, it is preferable that a diameter of the circle is equal to or grater than 5 mm. If the cross sectional shape of the communication through hole 13b is other than the circle, it is preferable that the cross sectional area is that of the circle having a diameter equal to or greater than 5 mm.

According to the structure as mentioned above, because water is not accumulated in the additional air chamber SC as time passed. Therefore, the vehicle wheel 10 can stably provide a desired performance in reducing noise by serving as the Helmholtz resonator.

The present invention is not limited to the first embodiment, but may be modified. For example, to satisfy the relation of D1≦D2 the protruding part 18 is formed to have an upward slope from the root part 18a toward the tip of the protruding part 18 with respect to the bottom plate 25a. However, the structure is not limited to this. For example, the outer circumferential surface 11d of the well portion 11c fixing the additional air chamber 13 has an upward slope in a left direction of the width direction Y of the vehicle wheel 10 as shown in FIG. 2. This may satisfy the relation of D1≦D2.

The invention claimed is:

1. A vehicle wheel comprising:
a disk and a rim having a well portion and fixed to the disk for supporting a tire for the vehicle; and
an additional air chamber member secured to an outer circumferential surface of the well portion in a tire air chamber defined between the rim and the tire, the additional air chamber member comprising an additional air chamber and a communication pipe with a communication through hole therein for communication between the additional air chamber and the tire air chamber,
the additional air chamber having a peak in a radial direction of the vehicle wheel and the communication pipe protruding from the peak in a direction substantially parallel to an axial direction of the wheel,
wherein a radius D2 of rotation of the vehicle wheel at the tip of the communication through hole is equal to or greater than a radius D1 of rotation of the vehicle wheel at the peak of the additional air chamber.

2. The vehicle wheel as claimed in claim 1, wherein the additional air chamber member comprises more than one said additional air chamber, and said additional air chambers are separate from each other.

3. A vehicle wheel comprising:
a disk and a rim having a well portion and fixed to the disk for supporting a tire; and
an additional air chamber member that is secured to an outer circumferential surface of the well portion in a tire air chamber defined between the rim and the tire and defines an additional air chamber, the additional air chamber member comprising:
an outer plate formed to cause the additional air chamber to have a peak in a radial direction of the vehicle wheel; and
a communication pipe that is connected to the outer plate at the peak and includes a through hole for communication between the additional air chamber and the tire air chamber, and the communication pipe protruding from the peak in a direction substantially parallel to an axial direction of the wheel,
wherein a radius D2 of rotation of the vehicle wheel at the tip of the communication through hole is equal to or greater than a radius D1 of rotation of the vehicle wheel at an inner surface of the outer plate at the peak of the additional air chamber.

4. The vehicle wheel as claimed in claim 3, wherein the additional air chamber member comprises more than one said additional air chamber, and said additional air chambers are separate from each other.

\* \* \* \* \*